US012341599B2

(12) United States Patent
Adachi (10) Patent No.: US 12,341,599 B2
(45) Date of Patent: Jun. 24, 2025

(54) INFORMATION PROCESSING APPARATUS AND INFORMATION PROCESSING METHOD

(71) Applicant: KDDI CORPORATION, Tokyo (JP)

(72) Inventor: Takashi Adachi, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 239 days.

(21) Appl. No.: 18/107,689

(22) Filed: Feb. 9, 2023

(65) Prior Publication Data

US 2024/0107408 A1    Mar. 28, 2024

(30) Foreign Application Priority Data

Sep. 28, 2022    (JP) .................................. 2022-155398

(51) Int. Cl.
*H04W 36/14*    (2009.01)
*H04B 7/185*    (2006.01)

(52) U.S. Cl.
CPC ......... *H04B 7/18513* (2013.01); *H04W 36/14* (2013.01)

(58) Field of Classification Search
CPC ... H04W 36/14; H04W 84/06; H04W 36/322; H04B 7/18513
See application file for complete search history.

(56) References Cited

U.S. PATENT DOCUMENTS

| 6,020,845 A * | 2/2000 | Weinberg ............... H01Q 1/288 342/357.68 |
| 9,633,567 B1* | 4/2017 | Skoog .................... B64D 45/04 |
| 2019/0090141 A1 | 3/2019 | Fujii |
| 2022/0189321 A1* | 6/2022 | Kahn .................. G08G 5/0026 |

FOREIGN PATENT DOCUMENTS

| JP | 2017-168898 A | 9/2017 |
| JP | 2022125679 A * | 8/2022 .............. G08G 5/00 |

OTHER PUBLICATIONS

Machine translation of JP2022125679 A, downloaded from Espacenet. Nov. 16, 2024 (Year: 2024).*
"Dead Reckoning" entry in Wikipedia; downloaded off The Wayback Machine Jun. 19, 2022 (Year: 2022).*
"Predicting Aircraft Trajectories: a Deep Generative Convolutional Recurrent Neural Networks Approach" Y.Liu and M. Hansen, ArXiv ID 1812.11670, published Dec. 30, 2018 (Year: 2018).*

(Continued)

*Primary Examiner* — Kito R Robinson
*Assistant Examiner* — Tanya C Sienko
(74) *Attorney, Agent, or Firm* — Foley & Lardner LLP (57) ABSTRACT

A flight management server having an acquisition unit that acquires information indicating a scheduled flight path of a flying vehicle; a detection unit that detects that a switching process is to be executed for switching communication performed by the flying vehicle during flight between terrestrial communication using terrestrial communication equipment and satellite communication using a communication satellite; and an identification unit that identifies a position of the flying vehicle during execution of the switching process based on the scheduled flight path to be followed after the switching process has started.

17 Claims, 4 Drawing Sheets

(56) References Cited

OTHER PUBLICATIONS

"Random access optimization for initial access and seamless handover for 5G-satellite network" Z.Wang et al., Computer Networks, vol. 214, Sep. 4, 2022 (Year: 2022).*
"ECDIS: What Happens When the GPS Signal Goes Away?" R. Madden, The Maritime Executive Mar. 26, 2018 (https://Maritime-executive.com/author/Captain-Richard-Madden) (Year: 2018).*

* cited by examiner

INFORMATION PROCESSING APPARATUS AND INFORMATION PROCESSING METHOD

CROSS REFERENCE TO RELATED APPLICATION APPLICATION

Priority is claimed on Japanese Patent Application No. 2022-155398, filed Sep. 28, 2022, the content of which is incorporated herein by reference.

BACKGROUND OF THE INVENTION

Field of the Invention

The present invention relates to an information processing apparatus and an information processing method for processing information relating to a flying vehicle.

Description of Related Art

Patent Document 1 (Japanese Unexamined Patent Application, First Publication No. 2017-168898) discloses a communication terminal that can communicate by switching between terrestrial communication via a terrestrial base station and satellite communication via a communication satellite.

SUMMARY OF THE INVENTION

Therefore, an example of an objective of the present invention is to be able to identify the position of a flying vehicle when the flying vehicle switches the communication means between terrestrial communication and satellite communication.

An information processing apparatus according to a first aspect of the present invention has an acquisition unit that acquires information indicating a scheduled flight path of a flying vehicle; a detection unit that detects that a switching process is to be executed for switching communication performed by the flying vehicle during flight between terrestrial communication using terrestrial communication equipment and satellite communication using a communication satellite; and an identification unit that identifies a position of the flying vehicle during execution of the switching process based on the scheduled flight path to be followed after the switching process has started.

The identification unit may identify the position of the flying vehicle while the flying vehicle cannot perform the terrestrial communication and the satellite communication during execution of the switching process based on the scheduled flight path to be followed after the switching process has started.

The identification unit may identify a position on the scheduled flight path to be followed after the switching process has started as the position of the flying vehicle during execution of the switching process.

The acquisition unit may acquire, from the flying vehicle via communication means being used before the switching process starts, pre-switching position information indicating a position of the flying vehicle before the switching process starts, and the identification unit may identify the position of the flying vehicle during execution of the switching process based on the position of the flying vehicle indicated by the pre-switching position information and the scheduled flight path to be followed after the switching process has started.

The information processing apparatus may further have a display control unit that makes an information terminal associated with the flying vehicle display on a map, in different display modes, an image corresponding to the position of the flying vehicle indicated by the pre-switching position information, and an image corresponding to the position of the flying vehicle during execution of the switching process.

The acquisition unit may acquire, from the flying vehicle via communication means being used after the switching process has been completed, post-switching position information indicating a position of the flying vehicle after the switching process has been completed, and the identification unit may identify the position indicated by the post-switching position information as the position of the flying vehicle after the switching process has been completed.

The information processing apparatus may further have a display control unit that makes an information terminal associated with the flying vehicle display on a map, in different display modes, an image corresponding to the position of the flying vehicle during execution of the switching process, and an image corresponding to the position of the flying vehicle indicated by the post-switching position information.

The acquisition unit may acquire, from the flying vehicle via communication means being used after the switching process has been completed, post-switching position information indicating a position of the flying vehicle after the switching process has been completed, and the identification unit may identify the position of the flying vehicle during execution of the switching process based on the position of the flying vehicle indicated by the post-switching position information, and the scheduled flight path to be followed after the switching process has started.

The acquisition unit may acquire, from the flying vehicle via communication means being used after the switching process has been completed, post-switching position information indicating a position of the flying vehicle after the switching process has been completed, and the identification unit may identify the position of the flying vehicle during execution of the switching process based on the position of the flying vehicle indicated by the pre-switching position information, the position of the flying vehicle indicated by the post-switching position information, and the scheduled flight path to be followed after the switching process has started.

The acquisition unit may acquire weather information indicating the weather in a region containing the flying vehicle, and the identification unit may identify the position of the flying vehicle during execution of the switching process based on the weather information for the weather during execution of the switching process in addition to the scheduled flight path to be followed after the switching process has started.

The acquisition unit may acquire a flight speed of the flying vehicle, and the identification unit may identify the position of the flying vehicle during execution of the switching process based on the flight speed in addition to the scheduled flight path to be followed after the switching process has started.

The detection unit may detect that the switching process has started on the condition that the flying vehicle has output information indicating that the switching process has started.

The detection unit may detect that the switching process has started on the condition that a relationship between a threshold value and a radio signal strength of signals for the terrestrial communication satisfies a switching criterion.

An information processing method according to a second aspect of the present invention includes acquiring information indicating a scheduled flight path of a flying vehicle; detecting that a switching process is to be executed for switching communication performed by the flying vehicle during flight between terrestrial communication using terrestrial communication equipment and satellite communication using a communication satellite; and identifying a position of the flying vehicle during execution of the switching process based on the scheduled flight path to be followed after the switching process has started.

DETAILED DESCRIPTION OF THE INVENTION

[Outline of Flight Management System S]

Figure 1:
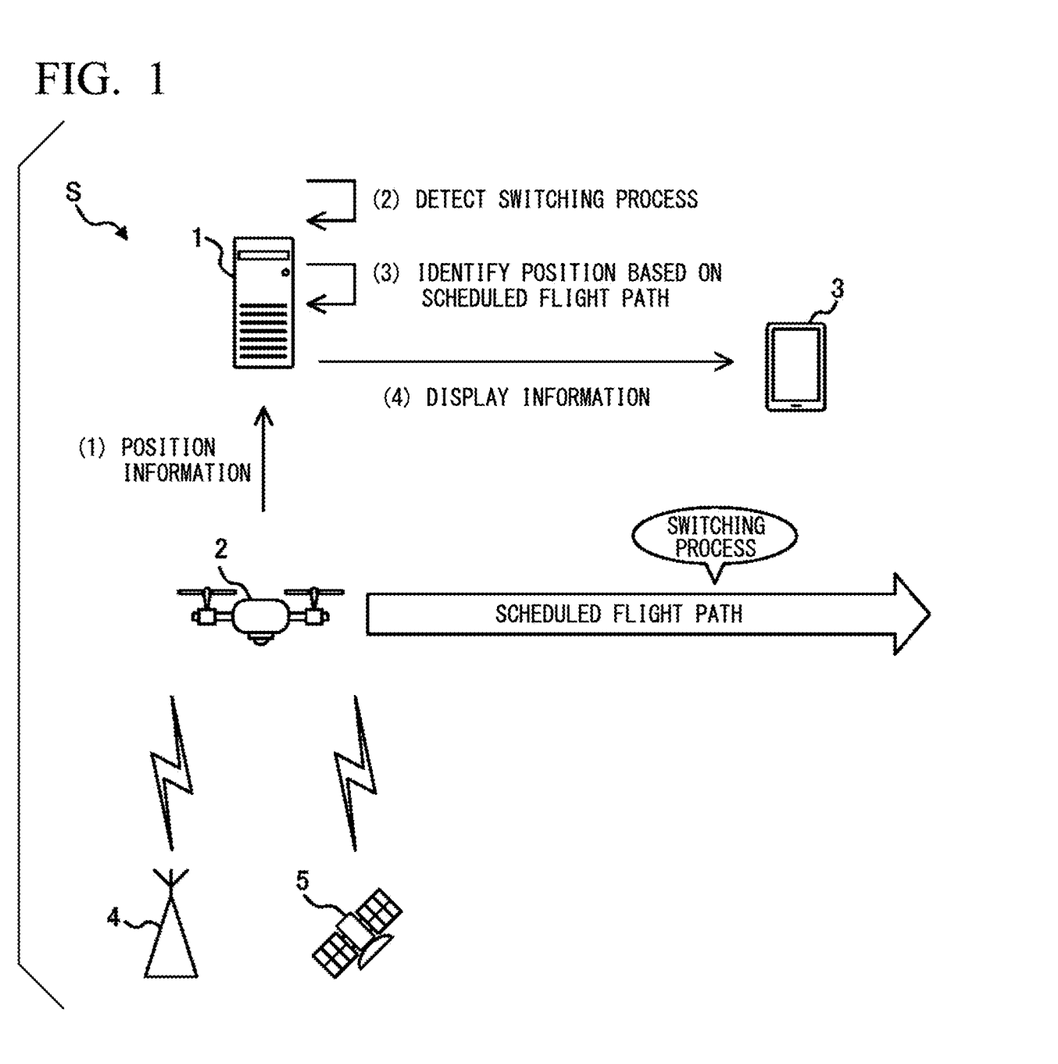
FIG. 1 is a schematic diagram of a flight management system according to an embodiment.

FIG. 1 is a schematic diagram of a flight management system S according to the present embodiment. The flight management system S includes a flight management server 1, a flying vehicle 2, and an information terminal 3. The flight management system S may include other terminals, apparatuses, or the like.

The flight management server 1 is a computer for managing information relating to the flight of the flying vehicle 2. The flight management server 1 is a single computer or multiple computers. Additionally, the flight management server 1 may be one or multiple virtual servers that operate on a cloud, which is a set of computer resources.

The flying vehicle 2 is an unmanned flying apparatus, such as a drone, that flies in the air. Additionally, the flying vehicle 2 may be a manned flying apparatus such as an aircraft or a flyable car. The flying vehicle 2 flies along a scheduled flight path that has been preset. The flying vehicle 2 has a communication unit for transmitting and receiving information, by radio communication, to and from the flight management server 1 via prescribed communication means. The flying vehicle 2 can switch the communication means used during flight between terrestrial communication making use of terrestrial communication equipment 4 and satellite communication making use of a communication satellite 5.

The communication equipment 4 is, for example, a terrestrially installed base station that relays communication signals transmitted respectively by the flight management server 1 and the flying vehicle 2. The communication equipment 4 supports communication standards such as 3G (Generation), 4G/LTE (Long-Term Evolution), 5G, etc.

The communication satellite 5 is, for example, an artificial satellite located in outer space, for relaying communication signals transmitted, respectively, by the flight management server 1 and the flying vehicle 2. The communication satellite 5 supports a prescribed satellite communication standard.

The information terminal 3 is a computer used by the user. The information terminal 3 is, for example, an information terminal such as a smartphone, a tablet terminal, or a personal computer.

The user is, for example, a manual operator who is manually operating a flying vehicle 2. Additionally, the user may be a manager (operator, etc.) managing the flight of multiple flying vehicles 2. The information terminal 3 has a display unit such as a liquid crystal display for displaying information, and a manual operation unit, such as a touch panel, for receiving manual operations by the user. The information terminal 3 transmits and receives information to and from the flight management server 1 by communication.

An outline of the process executed by the flight management system S according to the present embodiment will be explained below. The flight management server 1 acquires position information indicating the position of the flying vehicle 2 during flight ((1) in FIG. 1).

The flight management server 1 detects that a switching process is to be executed for switching the communication performed by the flying vehicle 2 during flight between terrestrial communication and satellite communication ((2) in FIG. 1). The flight management server 1, for example, detects that a switching process is to be executed, for example, on the condition that the flying vehicle 2 has output information indicating that a switching process has started or on the condition that the radio signal strength of communication signals received by the flying vehicle 2 has satisfied a prescribed switching criterion.

The flight management server 1 identifies the position of the flying vehicle 2 while the switching process is being executed based on the scheduled flight path to be followed after the switching process has started ((3) in FIG. 1). The flight management server 1, for example, identifies one of positions on the scheduled flight path to be followed after the switching process has started as the position of the flying vehicle 2 while the switching process is being executed.

The flight management server 1 transmits display information for displaying the identified position of the flying vehicle 2 to the information terminal 3 associated with the flying vehicle 2 ((4) in FIG. 1). The information terminal 3 displays an image corresponding to the position of the flying vehicle 2 on a map in accordance with display information received from the flight management server 1.

In this way, while the communication means of the flying vehicle 2 is being switched between terrestrial communication and satellite communication, the flight management system S identifies the position of the flying vehicle 2 based on the scheduled flight path during execution of the switching process. Thus, the flight management system S can identify the position of the flying vehicle 2 even in a situation in which the flying vehicle 2 cannot communicate while the flying vehicle 2 switches the communication means between terrestrial communication and satellite communication.

[Configuration of Flight Management System S]

Figure 2:
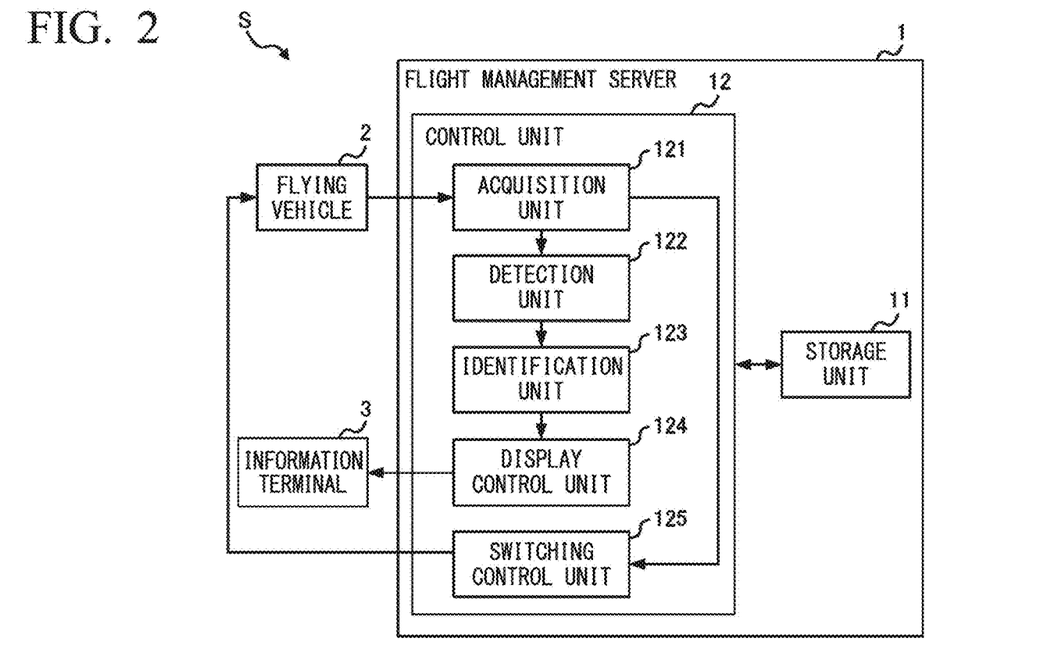
FIG. 2 is a block diagram of a flight management system according to an embodiment.

FIG. 2 is a block diagram of a flight management system S according to the present embodiment. In FIG. 2, the arrows indicate the main data flow, and there may be data flow other than that indicated in FIG. 2. In FIG. 2, the respective blocks indicate functional unit configurations rather than hardware (apparatus) unit configurations. For this reason, the blocks indicated in FIG. 2 may be installed in a single apparatus, or may be installed so as to be divided between multiple apparatuses. The exchange of data between the blocks may be performed by any means, such as by a data bus, a network, a portable storage medium, etc.

The flight management server 1 has a storage unit 11 and a control unit 12. The storage unit 11 is a storage medium including a ROM (Read-Only Memory), a RAM (Random Access Memory), a hard disk drive, etc. The storage unit 11 prestores a program to be executed by the control unit 12. The control unit 11 may be provided outside the flight management server 1, and in that case, may exchange data with the control unit 12 via a network.

The control unit 12 has an acquisition unit 121, a detection unit 122, an identification unit 123, a display control unit 124, and a switching control unit 125. The control unit 12 is a processor such as, for example, a CPU (Central Processing Unit), that functions as the acquisition unit 121, the detection unit 122, the identification unit 123, the display control unit 124, and the switching control unit 125 by executing a program stored in the storage unit 11. At least some of the functions of the control unit 12 may be executed by an electrical circuit. Additionally, at least some of the functions of the control unit 12 may be realized by the control unit 12 executing a program that is executed via a network.

Hereinafter, the process executed by the flight management system S will be explained in detail. The flying vehicle 2 during flight identifies its own position by using, for example, GNSS (Global Navigation Satellite System), and repeatedly transmits position information indicating the identified positions to the flight management server 1 by terrestrial communication or by satellite communication. Additionally, the flying vehicle 2 repeatedly transmits, to the flight management server 1, by means of terrestrial communication or satellite communication, communication information indicating which communication means, of terrestrial communication or satellite communication, is being used, and the radio signal strength of communication signals that are being received.

In the flight management server 1, the acquisition unit 121 acquires the position information and the communication information transmitted by the flying vehicle 2, and stores said information in the storage unit 11 in association with a flying vehicle ID (Identification) for identifying the flying vehicle 2 that is the transmission source.

The acquisition unit 121, for example, acquires pre-switching position information indicating the position of the flying vehicle 2 before the switching process starts, from the flying vehicle 2, via terrestrial communication or satellite communication, which is the communication means before the switching process starts. The acquisition unit 121 acquires post-switching position information indicating the position of the flying vehicle 2 after the switching process has been completed, from the flying vehicle 2, via terrestrial communication or satellite communication, which is the communication means after the switching process has been completed. The acquisition unit 121 may directly acquire the position information from the flying vehicle 2 or may acquire position information via another apparatus. The acquisition unit 121 does not need to acquire position information and communication information while the switching process is being executed.

Additionally, the acquisition unit 121 acquires scheduled flight information indicating the scheduled flight path (the scheduled flight positions at respective times, etc.) to be flown by the flying vehicle 2. The acquisition unit, for example, acquires scheduled flight information prestored in the storage unit 11 or acquires scheduled flight information from another apparatus that holds the scheduled flight information of the flying vehicle 2.

Additionally, the acquisition unit 121 acquires weather information indicating the weather in a region containing the flying vehicle 2. The weather information is information indicating the weather as actually measured or information indicating the predicted weather (weather forecasts, etc.). The weather information includes, for example, the wind direction and wind speed at respective positions in the air. The acquisition unit 121, for example, acquires weather information that is prestored in the storage unit 11 or acquires weather information from another apparatus that provides weather information.

Additionally, the acquisition unit 121 acquires the flight speed of the flying vehicle 2. The flight speed is the speed at which the flying vehicle has actually flown (the average value of the speed over a prescribed time period, etc.) or the speed according to the specifications of the flying vehicle 2. The acquisition unit 121, for example, acquires a flight speed prestored in the storage unit 11 or acquires the flight speed from the flying vehicle 2.

Additionally, the acquisition unit 121 acquires a radio signal map that is prestored in the storage unit 11. The radio signal map is, for example, information indicating the radio signal strengths of signals for both terrestrial communication and satellite communication at respective positions in the sky. The radio signal map may be a three-dimensional radio signal map indicating the radio signal strength at each altitude at the respective positions in the sky. The radio signal map is, for example, generated by simulating the radio signal strengths of communication signals at the respective positions in the sky, or generated by actually measuring the radio signal strengths of communication signals at the respective positions in the sky.

Figure 3:
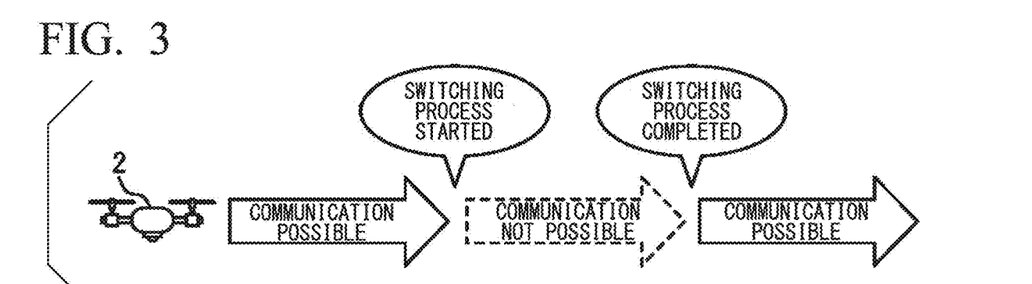
FIG. 3 is a schematic diagram for explaining a method for a detection unit to detect that a switching process is to be executed.

The detection unit 122 detects that a switching process is to be executed for switching the communication performed by the flying vehicle 2 during flight between terrestrial communication and satellite communication. FIG. 3 is a schematic diagram for explaining the method by which the detection unit 122 detects that the switching process is to be executed.

The detection unit 122 detects that the switching process has started. The detection unit 122, for example, detects that the switching process has started on the condition that the flying vehicle 2 has output starting information indicating that the switching process has started. In this case, the flying vehicle 2, for example, immediately before starting a switching process, transmits starting information to the flight management server 1 via terrestrial communication or satellite communication, which is the communication means being used before the switching process is started. The detection unit 122 detects that the switching process has started on the condition that starting information has been received from the flying vehicle 2.

Additionally, the detection unit 122 may, for example, detect that the switching process has started on the condition that the relationship between a prescribed threshold value and the radio signal strength of terrestrial communication signals has satisfied a switching criterion. The radio signal strength of the terrestrial communication signals is the radio signal strength at the position of the flying vehicle 2 indicated by a radio signal map acquired by the acquisition unit 121, or is the radio signal strength of communication signals received by the flying vehicle 2 indicated by the communication information acquired by the acquisition unit 121. In the case in which the radio signal map is a three-dimensional radio signal map, the detection unit 122 may use the radio signal strength on a radio signal map corresponding to the position and the altitude of the flying vehicle 2 during flight.

In the case in which the flying vehicle 2 is performing satellite communication, the detection unit 122, for example, detects that the switching process has started on the condition that the radio signal strength of terrestrial communication signals is equal to or higher than a threshold value. In the case in which the flying vehicle 2 is performing terrestrial communication, the detection unit 122, for example, detects that the switching process has started on the condition that the radio signal strength of terrestrial communication signals is equal to or lower than a threshold value. The detection unit 122 may detect that the switching process has started based on another switching criterion.

When a switching process starts, the flying vehicle 2 cannot communicate until the switching process is completed. Furthermore, the detection unit 122 detects that the switching process has been completed. The detection unit 122, for example, detects that the switching process has been completed on the condition that the flying vehicle 2 has output completion information indicating that the switching process has been completed. In this case, the flying vehicle 2, for example, immediately after the switching process has been completed, transmits completion information to the flight management server 1 via terrestrial communication or satellite communication, which is the communication means used after the switching process has been completed. The detection unit 122 detects that the switching process has been completed on the condition that the completion information has been received from the flying vehicle 2.

Figure 4:
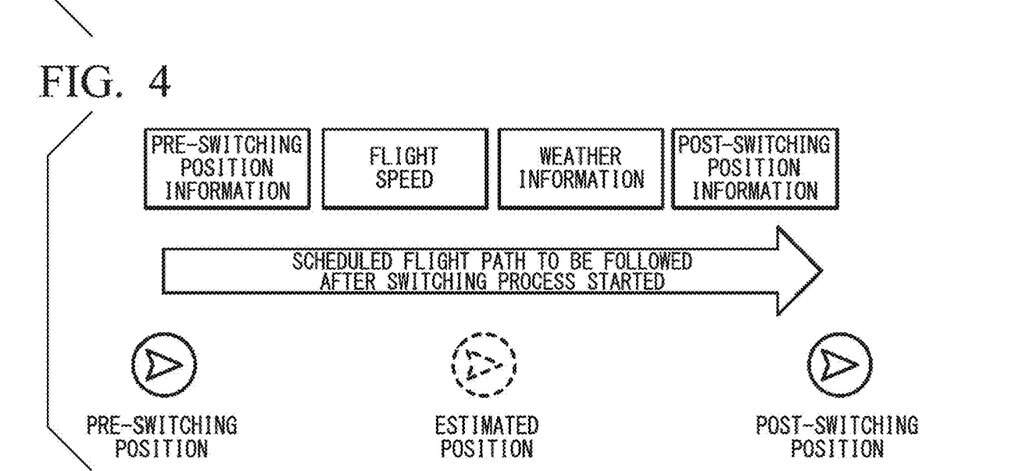
FIG. 4 is a schematic diagram for explaining a method for an identification unit to identify the position of the flying vehicle.

The identification unit 123 identifies the position of the flying vehicle 2 based on information acquired by the acquisition unit 121. FIG. 4 is a schematic diagram for explaining the method for the identification unit 123 to identify the position of the flying vehicle 2.

The identification unit 123 identifies, as the position of the flying vehicle 2 before the switching process starts, the position indicated by the pre-switching position information acquired by the acquisition unit 121 before the detection unit 122 detects that the switching process has started.

The identification unit 123, on the condition that the detection unit 122 has detected that the switching process has started, estimates an estimated position, which is the position of the flying vehicle 2 while the flying vehicle 2 is not able to perform terrestrial communication and satellite communication during the execution of the switching process, based on the scheduled flight path to be followed by the flying vehicle 2 after the switching process has started. The identification unit 123 identifies the estimated position as the position of the flying vehicle 2.

The identification unit 123, for example, estimates, as the estimated position, on the scheduled flight path indicated by the scheduled flight information acquired by the acquisition unit 121, one of the positions on the scheduled flight path to be followed after the switching process has started. In this way, the flight management system S can estimate the position of the flying vehicle 2 based on the scheduled flight path, even in a situation in which the flying vehicle 2 becomes unable to communicate while the flying vehicle 2 switches the communication means between terrestrial communication and satellite communication.

The identification unit 123 may estimate the estimated position based on at least one of the flight speed of the flying vehicle 2 and weather information for the weather during execution of the switching process in addition to the scheduled flight path to be followed after the switching process has started. The identification unit 123, for example, estimates, as the estimated position, the position for the case in which the flying vehicle 2 has flown on the scheduled flight path at the flight speed acquired by the acquisition unit 121 during the elapsed time period from the time at which the detection unit 122 detected that the switching process has started until the current time. In this way, the flight management system S can improve the accuracy for estimating the position of the flying vehicle 2 by considering the flight speed of the flying vehicle 2. Additionally, the identification unit 123 may use specifications other than the flight speed of the flying vehicle 2 to estimate the estimated position.

The identification unit 123 may change the flight speed used to estimate the estimated position in accordance with a wind direction and a wind speed indicated by the weather information during execution of the switching process, acquired by the acquisition unit 121. The identification unit 123, for example, makes the flight speed lower by a value corresponding to the wind speed in the case in which there is a headwind with respect to the travel direction of the flying vehicle 2, and makes the flight speed higher by a value corresponding to the wind speed in the case in which there is a tailwind with respect to the travel direction of the flying vehicle 2. In this way, the flight management system S can improve the accuracy for estimating the position of the flying vehicle 2 by taking the weather in the region containing the flying vehicle 2 into consideration.

The identification unit 123 may estimate the estimated position based on the position of the flying vehicle 2 before the switching process starts, indicated by the pre-switching position information, and the scheduled flight path to be followed after the switching process has started. The identification unit 123, for example, calculates a deviation vector indicating the deviation between the scheduled flight path and the position of the flying vehicle 2 before the switching process starts, and estimates, as the estimated position, a position obtained by adding the deviation vector to the position on the scheduled flight path to be followed after the switching process has started. In this way, the flight management system S can improve the accuracy for estimating the position of the flying vehicle 2 by taking into consideration the deviation between the scheduled flight path and the position of the flying vehicle 2 before the switching process starts.

The identification unit 123 may estimate the estimated position based on the position of the flying vehicle 2 after having completed the switching process, indicated by the post-switching position information, and the scheduled flight path to be followed after the switching process has started. The identification unit 123, for example, calculates a deviation vector indicating the deviation between the scheduled flight path and the position of the flying vehicle 2 after the switching process has been completed, and estimates the estimated position as a position obtained by adding the deviation vector to the position on the scheduled flight path to be followed after the switching process has started. In this way, the flight management system S can improve the accuracy for estimating the position of the flying vehicle 2 by taking into consideration the deviation between the scheduled flight path and the position of the flying vehicle 2 after the switching process has been completed, for example, in the case in which the position of the flying vehicle 2 during execution of the switching process is identified after the fact, i.e., after the switching process has been completed.

Additionally, the identification unit 123 may estimate the estimated position by using both the position of the flying vehicle 2 before the switching process starts, indicated by the pre-switching position information, and the position of the flying vehicle 2 after the switching process has been completed, indicated by the post-switching position information. In this way, the flight management system S can further improve the accuracy for estimating the position of the flying vehicle 2.

The identification unit 123, after the detection unit 122 has detected that the switching process has been completed, identifies the position indicated by the post-switching position information acquired by the acquisition unit 121 as the position of the flying vehicle after the switching process has been completed.

The display control unit 124 displays the position of the flying vehicle 2 identified by the identification unit 123 on a map on the information terminal 3 associated with the flying vehicle 2. The user of the information terminal 3 is, for example, a manual operator manually operating the flying vehicle 2, or a manager managing the flight of the flying vehicle 2.

The display control unit 124 transmits, to the information terminal 3 associated with the flying vehicle 2, display information for displaying the position of the flying vehicle 2 identified by the identification unit 123. The display information is, for example, information including the position (coordinates, etc.) of the flying vehicle 2 identified by the identification unit 123, information indicating the display mode of the position of the flying vehicle 2, and the scheduled flight path of the flying vehicle 2. The position of the flying vehicle 2 included in the display information may be the latest single position of the flying vehicle 2, or may be multiple positions identified during the flight of the flying vehicle 2.

Figure 5:
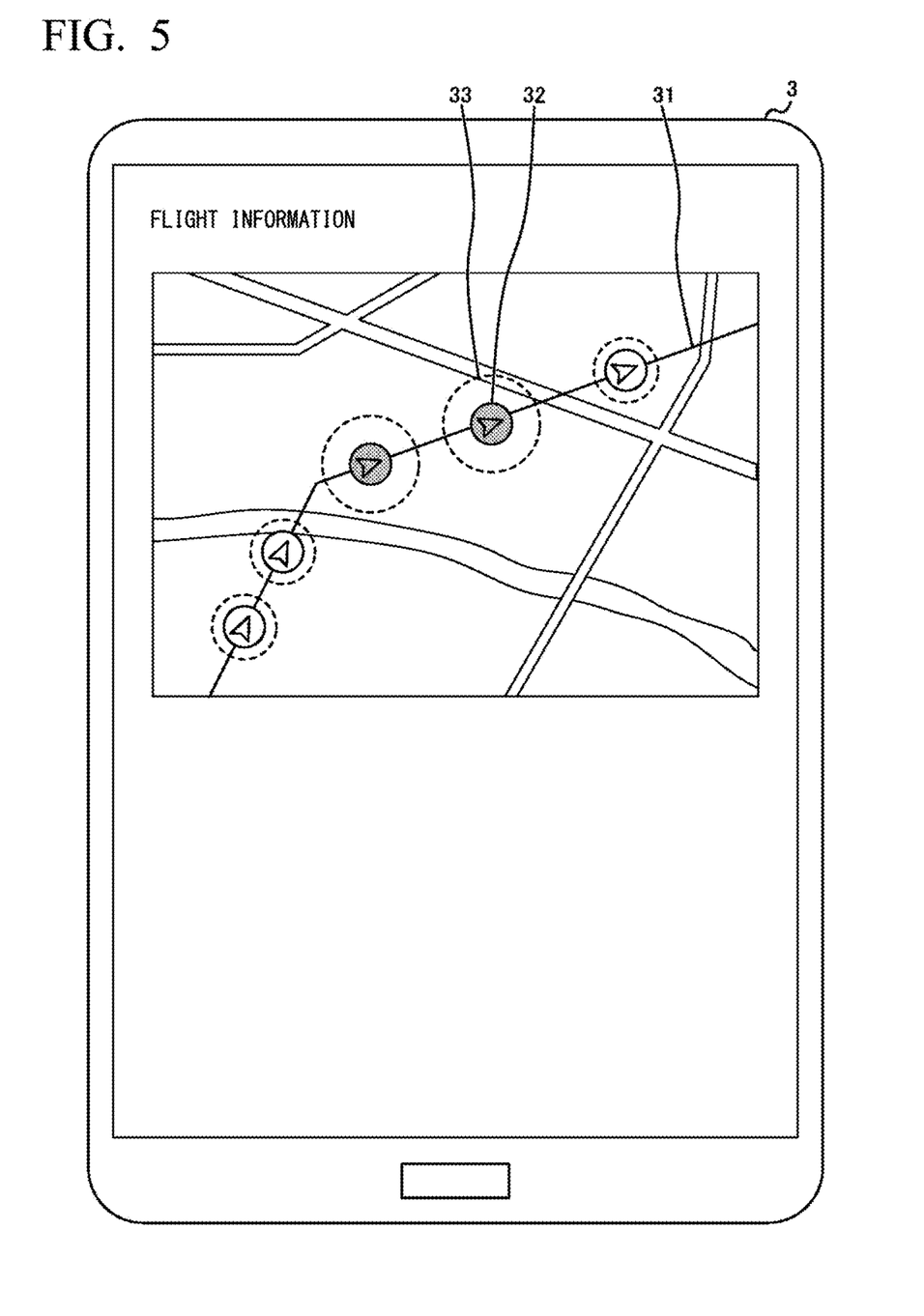
FIG. 5 is a schematic diagram for explaining a method for a display control unit to display the position of the flying vehicle on an information terminal.

FIG. 5 is a schematic diagram for explaining the method by which the display control unit 124 displays the position of the flying vehicle 2 on the information terminal 3. The information terminal 3 displays an image corresponding to the position of the flying vehicle 2 on a map in accordance with the display information received from the flight management server 1. The information terminal 3 may display, on the display unit, a map that is prestored in a storage unit of the information terminal 3, or may display, on the display unit, a map received from the flight management server 1 or another apparatus.

The display control unit 124, for example, displays the scheduled flight path 31, a position image 32 corresponding to the position of the flying vehicle 2, and a risk range 33 defined with respect to the position of the flying vehicle 2 so as to be overlaid on a map on the information terminal 3. The position image 32 is an image, such as an icon, displayed at the position on the map corresponding to the position of the flying vehicle 2. In the example in FIG. 5, the display control unit 124 displays, on the map, multiple position images 32 corresponding to multiple positions identified during the flight of the flying vehicle 2. However, just a position image 32 corresponding to the latest single position of the flying vehicle 2 may be displayed on the map.

The display control unit 124 may display on the map, in different display modes (colors, patterns, sizes, etc.), a position image 32 corresponding to the position of the flying vehicle 2 before the switching process starts, indicated by the pre-switching position information, and a position image 32 corresponding to the position (i.e., the estimated position estimated by the identification unit 123) of the flying vehicle 2 during execution of the switching process. Additionally, the display control unit 124 may display on the map, in different display modes (colors, patterns, sizes, etc.), a position image 32 corresponding to the position (i.e., the estimated position estimated by the identification unit 123) of the flying vehicle 2 during execution of the switching process, and a position image 32 corresponding to the position of the flying vehicle 2 after the switching process has been completed, indicated by the post-switching position information. In this way, the flight management system S can allow a user to easily distinguish between whether or not the displayed position of the flying vehicle 2 is an estimated position.

The risk range 33 is the range for which there is a possibility of approaching near the flying vehicle 2. The risk range 33 is, for example, a circle with a prescribed radius, centered at the position of the flying vehicle 2. The display control unit 124, on the information terminal 3, makes the risk range 33 during execution of the switching process larger than the risk range 33 before or after the switching process starts. In this way, the flight management system S can allow a user to easily understand, as a range on the map, the fact that the actual position of the flying vehicle 2 is not displayed due to the switching process. Additionally, the display control unit 124 may change the size of the risk range 33 in accordance with the weather information or specifications (size, etc.) of the flying vehicle 2.

The switching control unit 125 controls the switching of the communication performed by the flying vehicle 2 during flight between terrestrial communication and satellite communication in response to a prescribed condition having been satisfied. The switching control unit 125, for example, switches the communication performed by the flying vehicle 2 between terrestrial communication and satellite communication by transmitting, to the flying vehicle 2, by terrestrial communication or satellite communication, control information for switching the communication means between terrestrial communication and satellite communication. The flying vehicle 2 switches the communication means between terrestrial communication and satellite communication in accordance with control information received from the flight management server 1.

The switching control unit 125, for example, controls the switching of the communication performed by the flying vehicle 2 between terrestrial communication and satellite communication on the condition that the relationship between a prescribed threshold value and the radio signal strength of terrestrial communication signals satisfies a switching criterion. The radio signal strength of the terrestrial communication signals is the radio signal strength at the position of the flying vehicle 2 indicated by a radio signal map acquired by the acquisition unit 121, or the radio signal strength of communication signals received by the flying vehicle 2 indicated by communication information acquired by the acquisition unit 121. In the case in which the radio signal map is a three-dimensional radio signal map, the detection unit 122 may use the radio signal strength on the radio signal map corresponding to the position and the altitude of the flying vehicle 2 during flight.

In the case in which the flying vehicle 2 is performing satellite communication, the switching control unit 125, for example, controls switching of the communication performed by the flying vehicle 2 from satellite communication to terrestrial communication on the condition that the radio signal strength of the terrestrial communication signals is equal to or higher than a threshold value. In the case in which the flying vehicle 2 is performing terrestrial communication, the switching control unit 125, for example, controls switching of the communication performed by the flying vehicle 2 from terrestrial communication to satellite communication on the condition that the radio signal strength of the terrestrial communication signals is equal to or lower than a threshold value. The detection unit 122 may control switching of the communication performed by the flying vehicle 2 between terrestrial communication and satellite communication based on other switching criteria.

[Flow of Information Processing Method]

Figure 6:
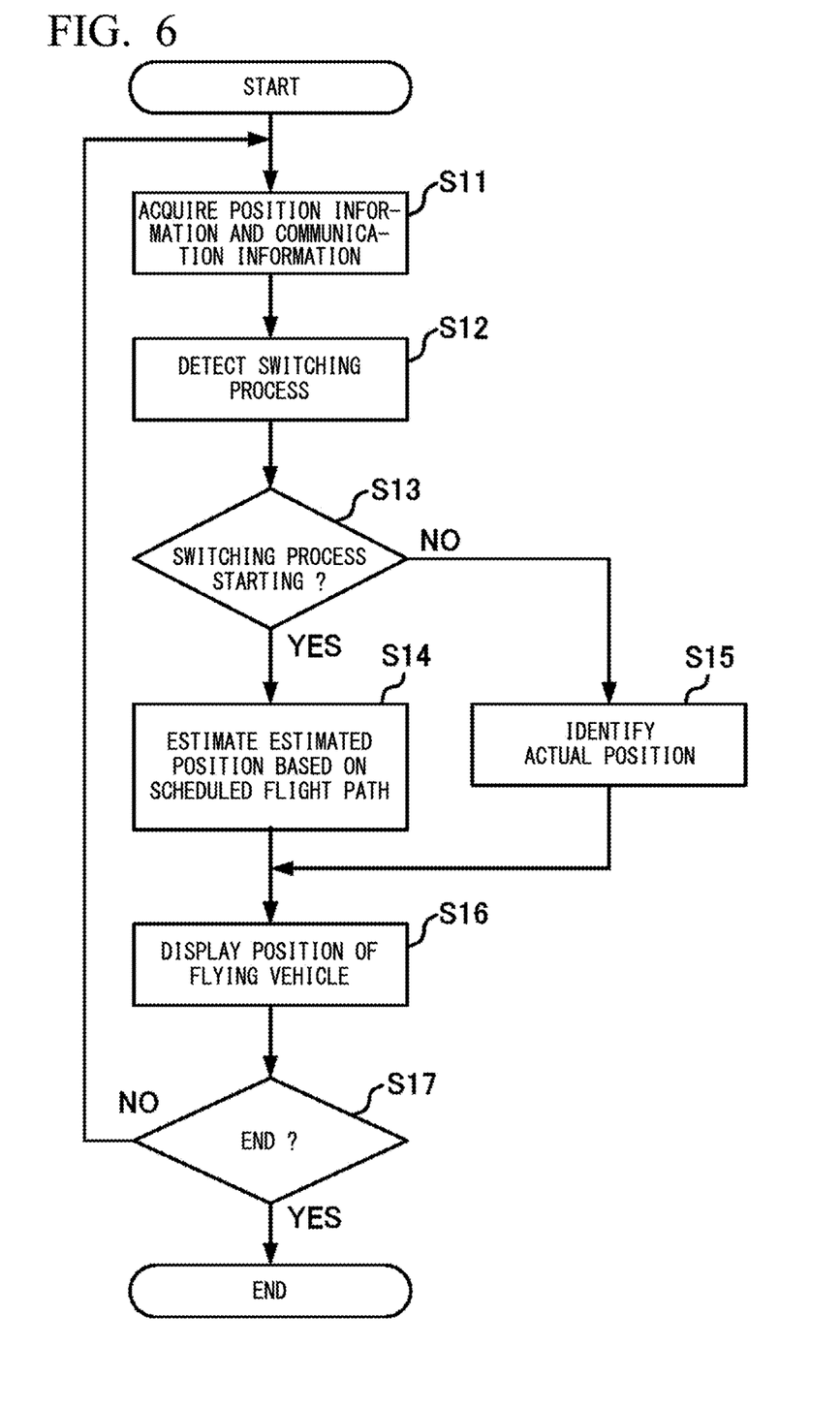
FIG. 6 is a diagram indicating a flow chart for an information processing method executed by a flight management server according to an embodiment.

FIG. 6 is a diagram depicting a flow chart of the information processing method executed by the flight management server 1 according to the present embodiment. In the flight management server 1, the acquisition unit 121 acquires position information and communication information transmitted by the flying vehicle 2, and stores the information in the storage unit 11 in association with a flying vehicle ID for identifying the flying vehicle 2 that is the transmission source (S11). Additionally, the acquisition unit 121 acquires information such as scheduled flight information, weather information, flight speed, and a radio signal map, used for detecting the switching process and displaying the position of the flying vehicle 2.

The detection unit 122 detects that a switching process is to be executed for switching the communication performed by the flying vehicle 2 during flight between terrestrial communication and satellite communication (S12). The detection unit 122, for example, detects that the switching process has started in response to the flying vehicle 2 having output starting information or the relationship between a prescribed threshold value and the radio signal strength of terrestrial communication signals having satisfied a switching criterion. Additionally, the detection unit 122, for example, detects that the switching process has been completed in response to the flying vehicle 2 having output completion information.

The identification unit 123, in the case in which the detection unit 122 has detected that a switching process has started (YES in S13), estimates an estimated position, which is the position of the flying vehicle 2 while the flying vehicle 2 cannot perform terrestrial communication and satellite communication during execution of the switching process, based on the scheduled flight path to be followed by the flying vehicle 2 after the switching process has started (S14). The identification unit 123 identifies the estimated position as the position of the flying vehicle 2.

The identification unit 123, in the case in which the detection unit 122 has not detected that the switching process has started or in the case in which the detection unit 122 has detected that the switching process has been completed (NO in S13), identifies the actual position of the flying vehicle 2 (for example, the position indicated by pre-switching position information or post-switching position information acquired by the acquisition unit 121) as the position of the flying vehicle 2 (S15).

The display control unit 124 displays the position of the flying vehicle 2 identified by the identification unit 123 on a map on an information terminal 3 associated with the flying vehicle 2 (S16).

In the case in which prescribed ending conditions (for example, the user having performed a manual ending operation) are not satisfied (NO in S17), the flight management server 1 repeats steps S11 to S16. In the case in which the prescribed ending conditions have been satisfied (YES in S17), the flight management server 1 ends the process.

Effects of Embodiments

If there is a time period during which the flying vehicle 2 cannot communicate while switching the communication means between terrestrial communication and satellite communication, then the flying vehicle 2 will not be able to transmit current position information to the outside. The flight management system S according to the present embodiment identifies the position of the flying vehicle 2 based on the scheduled flight path during execution of the switching process while the communication means of the flying vehicle 2 is switched between terrestrial communication and satellite communication. In this way, the flight management system S can identify the position of the flying vehicle 2 even in a situation in which the flying vehicle 2 cannot communicate while the flying vehicle 2 switches the communication means between terrestrial communication and satellite communication.

First Modified Example

In the embodiments described above, the flight management server 1 functions as an information processing apparatus that performs processes for identifying the position of the flying vehicle 2. In the present modified example, one of multiple flying vehicles 2 included in the flight management system S functions as an information processing apparatus that performs processes for identifying the position of the flying vehicle 2.

In this case, a processor in the flying vehicle 2 functions, for example, as an acquisition unit 121, a detection unit 122, an identification unit 123, a display control unit 124, and a switching control unit 125. According to the flight management system S in the present modified example, even in the case in which there is no flight management server 1, one of the flying vehicles 2 can perform a process for identifying the position of the flying vehicle 2.

Second Modified Example

In the embodiments described above, the flight management server 1 functions as an information processing apparatus that performs processes for identifying the position of the flying vehicle 2. In the present modified example, the flight management server 1 and the flying vehicle 2 cooperate to function as an information processing apparatus that performs processes for identifying the position of the flying vehicle 2. In this case, for example, a processor in the flying vehicle 2 functions as an acquisition unit 121, a detection unit 122, and a switching control unit 125, and a processor in the flight management server 1 functions as an identification unit 123 and a display control unit 124. In the flying vehicle 2, the detection unit 122 detects that a switching process is to be executed for switching the communication performed by the flying vehicle 2 between terrestrial communication and satellite communication, and thereafter, in the flight management server 1, based on the detection results in the flying vehicle 2, the identification unit 123 estimates an estimated position of the flying vehicle 2 during execution of the switching process based on a scheduled flight path of the flying vehicle 2, and the display control unit 124 displays the position of the flying vehicle 2 on a map on an information terminal 3. According to the flight management system S in the present modified example, the processing load can be distributed between the flight management server 1 and the flying vehicle 2.

Due to the present embodiments, it is possible to contribute to Goal 9, "Build resilient infrastructure, promote sustainable industrialization, and foster innovation" among the sustainable development goals (SDGs) advanced by the United Nations.

As mentioned above, several features are proposed in connection with an information processing apparatus and an information processing method for processing information regarding a flying vehicle.

The flying vehicle flies while transmitting and receiving information to and from a server by means of communication. However, there are cases in which a time period of a few seconds to several tens of seconds is required when the flying vehicle switches the communication means between terrestrial communication and satellite communication, and during that time period, the flying vehicle is not able to communicate. There was a problem in that, in situations in which the flying vehicle cannot communicate, the flying vehicle becomes unable to transmit position information to the outside by means of communication.

At least one exemplary embodiment, for example, provides the effect of allowing the position of the flying vehicle to be identified when the flying vehicle switches the communication means between terrestrial communication and satellite communication.

Although the present embodiment has been explained above, the technical scope is not limited to what is described regarding the embodiments above, and various modifications and changes are possible within the scope thereof. For example, all or some of the apparatuses may be configured in a functionally or physically distributed or integrated manner, in arbitrary units. Additionally, new embodiments obtained by arbitrarily combining multiple embodiments are also included among the present embodiments. The effects of the new embodiments obtained by combination are a combination of the effects of the original embodiments.

The processors in the flight management server 1 and the flying vehicle 2 execute the steps (processes) included in the information processing method indicated in FIG. 6. The processors in the flight management server 1 and the flying vehicle 2, for example, execute the information processing method indicated in FIG. 6 by executing a program for executing the information processing method indicated in FIG. 6. Some of the steps included in the information processing method indicated in FIG. 6 may be omitted, the order of the steps may be changed, and multiple steps may be performed simultaneously.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing apparatus comprising:
   an acquisition unit that acquires information indicating a scheduled flight path of a flying vehicle;
   a detection unit that detects that a switching process is to be executed for switching communication performed by the flying vehicle during flight between terrestrial communication using terrestrial communication equipment and satellite communication using a communication satellite; and
   an identification unit that identifies, after the switching process has been completed, a position of the flying vehicle during execution of the switching process, using a difference between the scheduled flight path to be followed after the switching process has started and a position of the flying vehicle after the switching process has been completed.

2. The information processing apparatus according to claim 1, wherein
   the identification unit identifies, based on the scheduled flight path to be followed after the switching process has started, the position of the flying vehicle when the flying vehicle cannot perform the terrestrial communication and the satellite communication during execution of the switching process.

3. The information processing apparatus according to claim 1, wherein
   the identification unit identifies a position on the scheduled flight path to be followed after the switching process has started as the position of the flying vehicle during execution of the switching process.

4. The information processing apparatus according to claim 1, wherein
   the acquisition unit acquires, from the flying vehicle via communication means being used before the switching process starts, pre-switching position information indicating a position of the flying vehicle before the switching process starts; and
   the identification unit identifies the position of the flying vehicle during execution of the switching process based on the position of the flying vehicle indicated by the pre-switching position information and the scheduled flight path to be followed after the switching process has started.

5. The information processing apparatus according to claim 4, further comprising:
   a display control unit that makes an information terminal associated with the flying vehicle display on a map, in different display modes, an image corresponding to the position of the flying vehicle indicated by the pre-switching position information, and an image corresponding to the position of the flying vehicle during execution of the switching process.

6. The information processing apparatus according to claim 4, wherein:
   the acquisition unit acquires, from the flying vehicle via communication means being used after the switching process has been completed, post-switching position information indicating the position of the flying vehicle after the switching process has been completed; and
   the identification unit identifies the position of the flying vehicle during execution of the switching process based on the position of the flying vehicle indicated by the pre-switching position information, the position of the flying vehicle indicated by the post-switching position information, and the scheduled flight path to be followed after the switching process has started.

7. The information processing apparatus according to claim 1, wherein:
   the acquisition unit acquires, from the flying vehicle via communication means being used after the switching process has been completed, post-switching position information indicating the position of the flying vehicle after the switching process has been completed; and
   the identification unit identifies the position indicated by the post-switching position information as the position of the flying vehicle after the switching process has been completed.

8. The information processing apparatus according to claim 7, further comprising:
   a display control unit that makes an information terminal associated with the flying vehicle display on a map, in different display modes, an image corresponding to the position of the flying vehicle during execution of the switching process, and an image corresponding to the position of the flying vehicle indicated by the post-switching position information.

9. The information processing apparatus according to claim 1, wherein:
the acquisition unit acquires, from the flying vehicle via communication means being used after the switching process has been completed, post-switching position information indicating the position of the flying vehicle after the switching process has been completed; and
the identification unit identifies the position of the flying vehicle during execution of the switching process based on the position of the flying vehicle indicated by the post-switching position information, and the scheduled flight path to be followed after the switching process has started.

10. The information processing apparatus according to claim 1, wherein:
the acquisition unit acquires weather information indicating the weather in a region containing the flying vehicle; and
the identification unit identifies the position of the flying vehicle during execution of the switching process based on the weather information for the weather during execution of the switching process in addition to the scheduled flight path to be followed after the switching process has started.

11. The information processing apparatus according to claim 1, wherein:
the acquisition unit acquires a flight speed of the flying vehicle; and
the identification unit identifies the position of the flying vehicle during execution of the switching process based on the flight speed in addition to the scheduled flight path to be followed after the switching process has started.

12. The information processing apparatus according to claim 1, wherein
the detection unit detects that the switching process has started on the condition that the flying vehicle has output information indicating that the switching process has started.

13. The information processing apparatus according to claim 1, wherein the detection unit detects that the switching process has started on the condition that a relationship between a threshold value and a radio signal strength of signals for the terrestrial communication satisfies a switching criterion.

14. The information processing apparatus according to claim 1, wherein
the identification unit identifies the position of the flying vehicle in a period from a start of the switching process to a completion of the switching process, during which the flying vehicle is unable to perform the terrestrial communication and the satellite communication, due to the execution of the switching process between the terrestrial communication and the satellite communication.

15. The information processing apparatus according to claim 1, wherein
the identification unit calculates a deviation vector indicating a deviation between the scheduled flight path and either a position of the flying vehicle before the switching process starts or the position of the flying vehicle after the switching process has been completed, and identifies, as a position of the flying vehicle during the execution of the switching process, a position obtained by adding the deviation vector to a position on the scheduled flight path after the switching process has started.

16. The information processing apparatus according to claim 1, further comprising
a display control unit that makes an information terminal associated with the flying vehicle display on a map an image corresponding to a position of the flying vehicle before the switching process starts and the position of the flying vehicle after the switching process has been completed and an image corresponding to a position of the flying vehicle during the execution of the switching process, together with a risk range, for which there is a possibility of approaching near the flying vehicle, defined with respect to the position of the flying vehicle,
wherein a size of the risk range of the position of the flying vehicle during the execution of the switching process is greater than a size of the risk range of the position of the flying vehicle before the switching process starts and after the switching process has been completed.

17. An information processing method, executed by a processor, the information processing method comprising:
acquiring information indicating a scheduled flight path of a flying vehicle;
detecting that a switching process is to be executed for switching communication performed by the flying vehicle during flight between terrestrial communication using terrestrial communication equipment and satellite communication using a communication satellite; and
identifying, after the switching process has been completed, a position of the flying vehicle during execution of the switching process, using a difference between on the scheduled flight path to be followed after the switching process has started and a position of the flying vehicle after the switching process has been completed.

* * * * *